United States Patent
Sirohi et al.

(10) Patent No.: US 8,584,983 B2
(45) Date of Patent: Nov. 19, 2013

(54) MAGNETIC DE-ROTATION SYSTEM FOR A SHAFT FAIRING SYSTEM

(75) Inventors: Jayant Sirohi, Milford, CT (US); Timothy Fred Lauder, Oxford, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 646 days.

(21) Appl. No.: 12/745,718

(22) PCT Filed: Dec. 3, 2007

(86) PCT No.: PCT/US2007/086230
§ 371 (c)(1),
(2), (4) Date: Jun. 2, 2010

(87) PCT Pub. No.: WO2009/073020
PCT Pub. Date: Jun. 11, 2009

(65) Prior Publication Data
US 2010/0264258 A1 Oct. 21, 2010

(51) Int. Cl.
*B64C 27/51* (2006.01)
(52) U.S. Cl.
USPC .................. 244/17.27; 244/17.23; 244/17.25
(58) Field of Classification Search
USPC ....................... 244/17.11, 17.25, 17.27, 17.23
See application file for complete search history.

(56) References Cited

U.S. PATENT DOCUMENTS

| | | |
|---|---|---|
| 2,323,786 A | 7/1943 | Beisel |
| 2,328,786 A | 9/1943 | Crowder |
| 2,397,632 A | 4/1946 | Stuart |
| 2,876,878 A * | 3/1959 | Sinclair et al. ............. 192/69.91 |
| 3,149,803 A | 9/1964 | Petrides et al. |
| 3,894,703 A | 7/1975 | Velasquez |
| 4,022,546 A | 5/1977 | Drees et al. |
| 4,053,258 A | 10/1977 | Mouille |
| 4,123,018 A | 10/1978 | Tassin de Montaigu |
| 4,212,588 A | 7/1980 | Fradenburgh |
| 4,478,379 A | 10/1984 | Kerr |
| 4,566,856 A | 1/1986 | Miller |
| 4,580,944 A | 4/1986 | Miller |
| 4,809,931 A | 3/1989 | Mouille et al. |
| 5,251,847 A | 10/1993 | Guimbal |
| 5,289,994 A | 3/1994 | Del Campo Aguilera |
| 5,364,230 A | 11/1994 | Krauss et al. |
| 5,415,364 A | 5/1995 | Grant |

(Continued)

FOREIGN PATENT DOCUMENTS

WO WO2006127955 11/2006
WO WO 2006127955 A2 * 11/2006

OTHER PUBLICATIONS

Search Report and Written Opinion for PCT/US2007/086230.

(Continued)

*Primary Examiner* — Tien Dinh
*Assistant Examiner* — Justin Benedik
(74) *Attorney, Agent, or Firm* — Carlson, Gaskey & Olds P.C.

(57) ABSTRACT

A magnetic de-rotation system includes an inner ring which supports an eddy current ring and at least one inner ring magnet and an outer ring which supports at least one outer ring magnet, attraction between the at least one inner ring magnet and the at least one outer ring magnet produces a stable rotational position for a fairing.

18 Claims, 6 Drawing Sheets

(56) References Cited

U.S. PATENT DOCUMENTS

| | | | |
|---|---|---|---|
| 5,521,448 A * | 5/1996 | Tecza et al. | 310/90.5 |
| 5,588,618 A | 12/1996 | Marze et al. | |
| 5,727,754 A | 3/1998 | Carter, Jr. | |
| 5,885,059 A | 3/1999 | Kovalsky et al. | |
| 5,954,480 A | 9/1999 | Schmaling et al. | |
| 6,268,676 B1 * | 7/2001 | Brunken, Jr. | 310/90.5 |
| 7,083,142 B2 | 8/2006 | Scott | |
| 7,229,251 B2 * | 6/2007 | Bertolotti et al. | 416/33 |
| 7,270,520 B2 * | 9/2007 | Sudre et al. | 416/245 R |
| 2005/0067527 A1 * | 3/2005 | Petersen | 244/17.11 |
| 2008/0293503 A1 * | 11/2008 | Vignal | 464/180 |
| 2010/0025526 A1 * | 2/2010 | Lawrence | 244/17.23 |

OTHER PUBLICATIONS

Title: Summary of Rotor Hub Drag Data; By: G.N. Keys and H.J. Rosenstein; Dated: Mar. 1978.

Title: Experimental Investigation of Advanced Hub and Pylon Fairing Configurations to Reduce Helicopter Drag; By: D.M. Martin, R.W. Mort, L.A. Young, P.K. Squires; Dated: Sep. 1993, NASA Technical Memorandum 4540.

Title: The First 50 Years Were Fine . . . But What Should We Do for an Encore?—The 1994 Alexander A. Nikolsky Lecture; By: Evan A. Fradenburgh; Journal of the American Helicopter Society; Jan. 1995.

Title: Rotorcraft Hub Shroud; By: LTC Chip Lunn; Brannon Industries; Apr. 11, 2006.

* cited by examiner

MAGNETIC DE-ROTATION SYSTEM FOR A SHAFT FAIRING SYSTEM

BACKGROUND

The present invention is directed to a de-rotation system which stabilizes a shaft fairing mounted between an upper hub fairing and a lower hub fairing.

The aerodynamic drag associated with a rotor hub of a rotary-wing aircraft is a significant portion of the overall aircraft drag, typically 25 percent to 30 percent for conventional single-rotor helicopters. The rotor system drag increases for a rotary-wing aircraft having a counter-rotating, coaxial rotor system primarily due to the dual rotor hubs and the interconnecting main rotor shaft assembly. For high-speed rotary wing aircraft, the increased drag resulting from the counter-rotating, coaxial rotor system may result in a relatively significant power penalty.

The aerodynamic drag of the dual counter-rotating, coaxial rotor system is generated by three main components—the upper rotor hub assembly, the lower rotor hub assembly, and the interconnecting main rotor shaft assembly. The drag contribution may be approximately 40 percent for each of the hubs, and 20 percent for the interconnecting main rotor shaft assembly. Typically, a rotor hub fairing arrangement is mounted to each of the upper rotor hub and the lower rotor hub such that overall drag on the rotorcraft is reduced. The interconnecting main rotor shaft between the upper rotor hub assembly and the lower rotor hub assembly, however, is typically exposed.

For a variety of reasons including, but not limited to, reduced drag and low observability, a shaft fairing has been developed to streamline the exposed interconnecting main rotor shaft. The shaft fairing is mounted to the counter-rotating, coaxial rotor system within a rotational environment between the upper hub fairing and the lower hub fairing through a bearing arrangement such that the shaft fairing is aligned with the fuselage in forward flight but is free to align with the relative wind during low speed maneuvering.

During some flight conditions, the shaft fairing may undesirably rotate relative the airframe. Rotation of the shaft fairing may increase drag and reduce the low-observability benefits of the shaft fairing.

SUMMARY

A de-rotation system for a fairing system according to an exemplary aspect of the present invention includes an inner ring which supports an eddy current ring and at least one inner ring magnet. The eddy current ring extends for a first axial length of the inner ring while the at least one inner ring magnet extends for a second axial length of the inner ring. An outer ring supports at least one outer ring magnet which axially extends between the first axial length and the second axial length, such that attraction between the at least one inner ring magnet and the at least one outer ring magnet produces a stable rotational position of the fairing system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF EXEMPLARY EMBODIMENTS

Figure 1A:
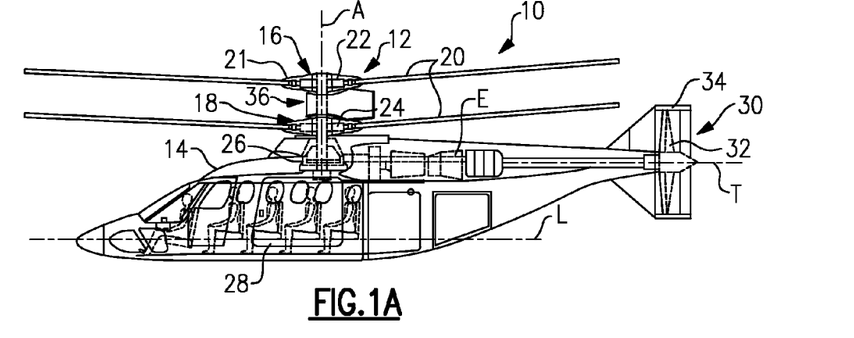
FIG. 1A is a general schematic views of an exemplary rotary wing aircraft embodiment for use with an exemplary embodiment of the present invention.

FIG. 1A illustrate an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in the disclosed embodiment, other counter-rotating, coaxial rotor systems will also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 project substantially radially outward from the hub assemblies 22, 24. Any number of blades 20 may be used with the rotor system 12.

A main gearbox 26 which may be located above the aircraft cabin 28 drives the rotor system 12. The translational thrust system 30 may be driven by the same main gearbox 26 which drives the rotor system 12. The main gearbox 26 is driven by one or more engines (illustrated schematically at E). The gearbox 26 may be interposed between the gas turbine engines E, the rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. The translational thrust system 30 includes a pusher propeller 32 mounted within an aerodynamic cowling 34. Although a tail mounted translational thrust system 30 is disclosed in this illustrated non-limiting embodiment, it should be understood that any such system or other translational thrust systems, including tractor and pod mounted systems, may alternatively or additionally be utilized.

The rotor system 12 includes a rotor hub fairing system 36 generally located between and around the upper and lower rotor systems 16, 18 such that the rotor hubs 22, 24 are at least partially contained therein. The rotor hub fairing system 36 provides significant drag reduction in which large-scale flow separation is greatly reduced.

Figure 1B:
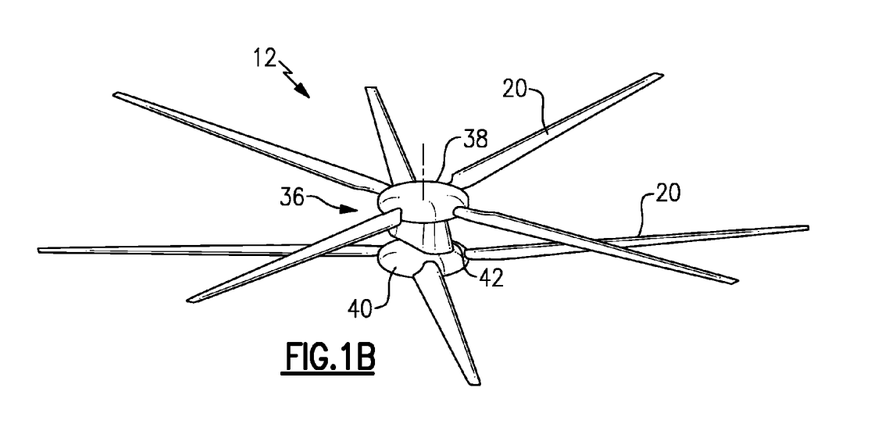
FIG. 1B is general perspective of a counter-rotating coaxial rotor system mounting a rotor hub fairing system.

The rotor hub fairing system 36 generally includes an upper hub fairing 38, a lower hub fairing 40 and a shaft fairing 42 therebetween (also illustrate in FIG. 1B). The rotor hub fairing system 36 is integrated such that the shaft fairing 42 generally follows the contours of the upper hub fairing 38 and the lower hub fairing 40 at the rotational interfaces therebetween to reduce interference effects between the separate fairings 38, 40, 42 and minimize flow separation in the junction areas. Furthermore, the lower hub fairing 40 is integrated with the airframe 14 in an area typically referred to on a rotorcraft as a pylon 14D (see FIG. 1C). It should be understood that fairing systems of various configurations will be usable with the present invention.

Figure 1C:
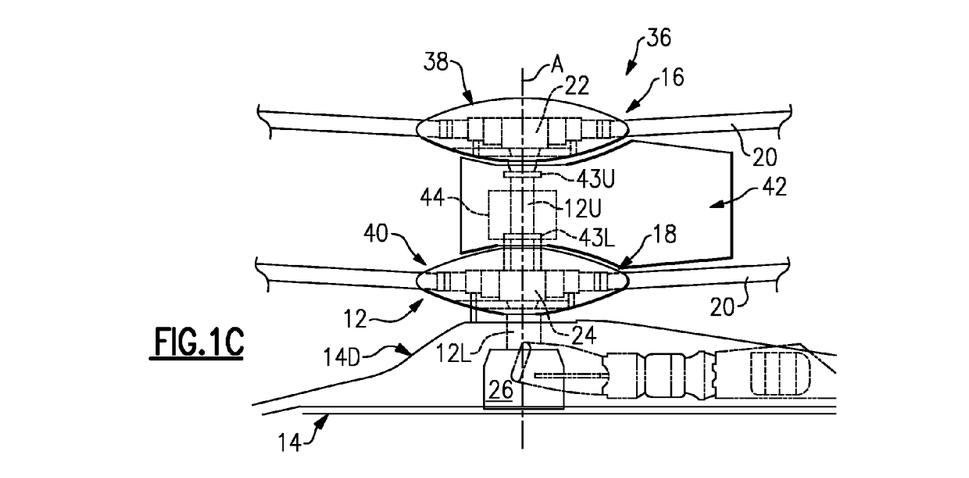
FIG. 1C is an expanded partial phantom view of a counter-rotating coaxial rotor system mounting a rotor hub fairing system according to an exemplary embodiment of the present invention.

Referring to FIG. 1C, the shaft fairing 42 may be mounted to the counter-rotating, coaxial rotor system 12 through a bearing arrangement 43U, 43L (illustrated schematically) such that the shaft fairing 42 may be positioned at a relative angular position about the axis of rotation A relative the airframe 14 by a de-rotation system 44. The upper bearing arrangement 43U and the lower bearing arrangement 43L may be respectively located adjacent an upper portion and a lower portion of the shaft fairing 42. The upper bearing arrangement 43U may be attached to one rotor shaft 12U while the lower bearing arrangement 43L attached to the other rotor shaft 12L such that the bearings are counter rotating and the net bearing drag is relatively low.

The de-rotation system 44 controls the position of the shaft fairing 42 about the axis of rotation A such that the shaft fairing 42 remains in a stable azimuthal position relative the airframe 14 irrespective of the flight regimes. Although the present invention is described in connection with a particular non-limiting aircraft embodiment, it should be readily appreciated that other systems which require a stationary fairing in a rotational environment will also benefit herefrom.

Figure 2A:
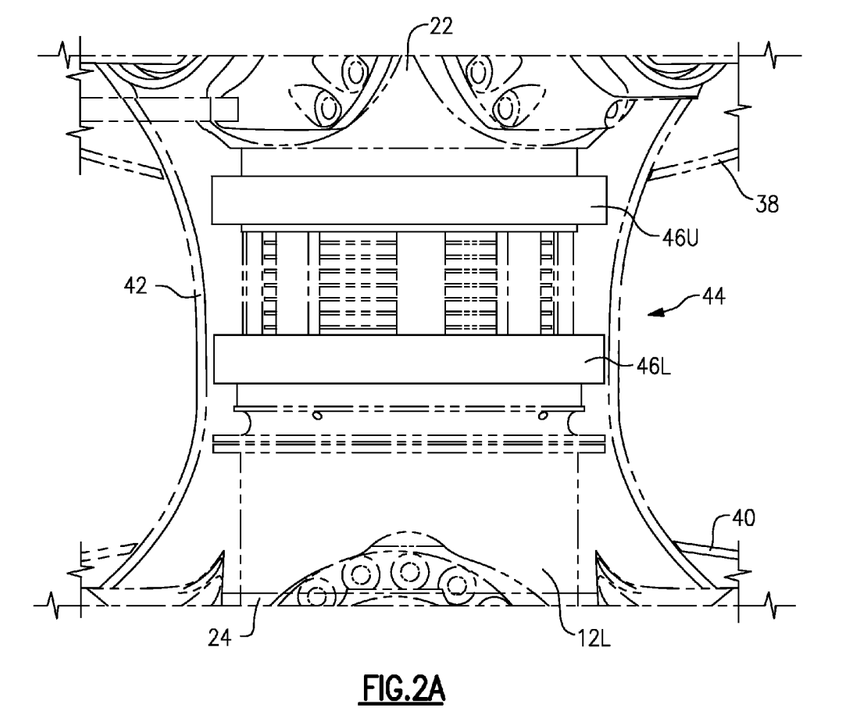
FIG. 2A is a front partial phantom view of a de-rotation system contained within a shaft fairing.
Figure 2B:
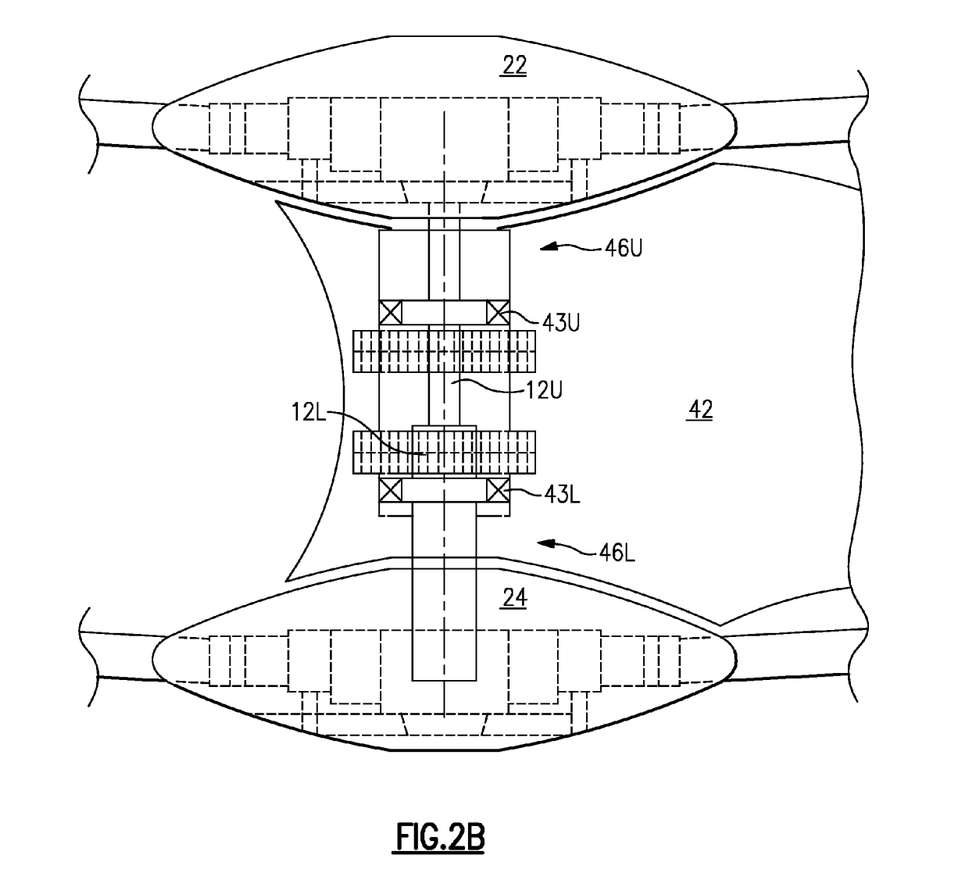
FIG. 2B is a side sectional schematic view of the de-rotation system illustrated in FIG. 2A.
Figure 2C:
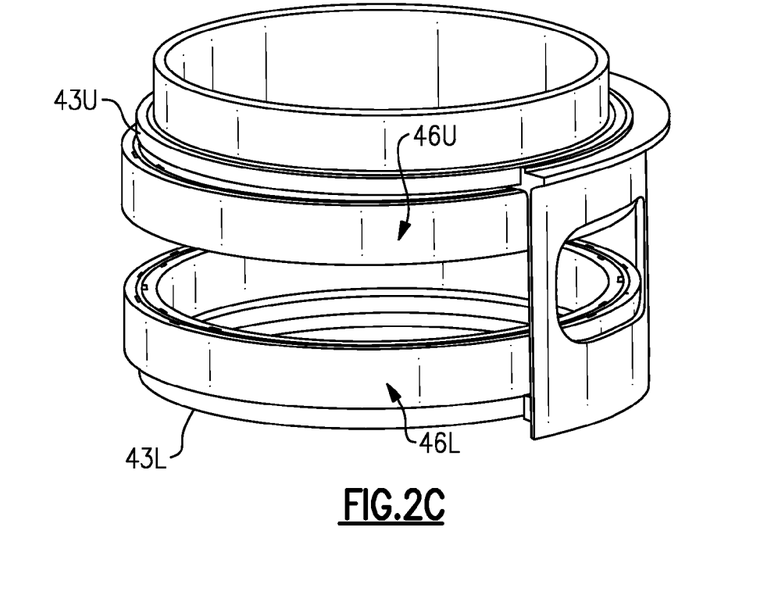
FIG. 2C is a side sectional schematic view of the de-rotation system illustrated in FIG. 2A with one portion of the housing removed.
Figure 2D:
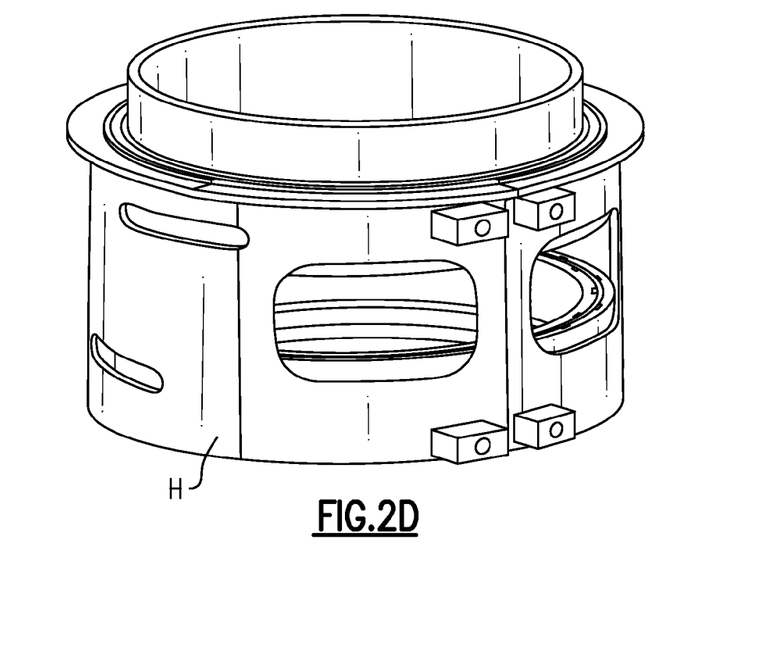
FIG. 2D is a side sectional schematic view of the de-rotation system illustrated in FIG. 2A with the complete housing installed.
Figure 3A:
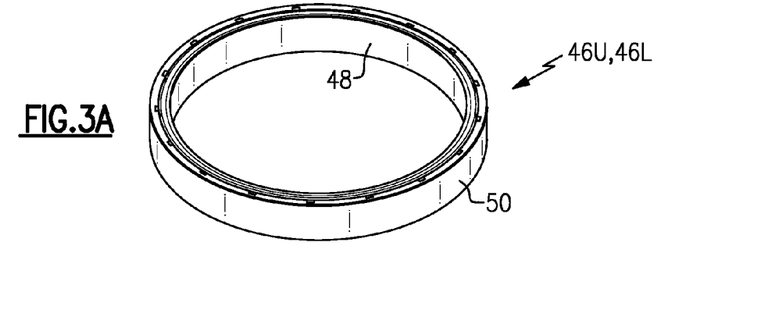
FIG. 3A is a perspective view of a magnetic ring assembly of the de-rotation system.

Referring to FIG. 2A, the de-rotation system 44 generally includes an upper magnetic ring assembly 46U and a lower magnetic ring assembly 46L. The upper magnetic ring assembly 46U is mounted to the shaft fairing 42 and the upper shaft 12U while the lower magnetic ring assembly 46L is mounted to the shaft fairing 42 and the lower shaft 12L (illustrated schematically in FIG. 2B) through a multi-part housing H (FIG. 2C) at, in one non-limiting embodiment housing attachment points Ha (FIG. 2D). Each magnetic ring assembly 46U, 46L includes an inner ring 48 fixed for rotation with the respective shaft 12U, 12L and an outer ring 50 which is fixed for rotation with the shaft fairing 42 (FIG. 3A).

Figure 3B:
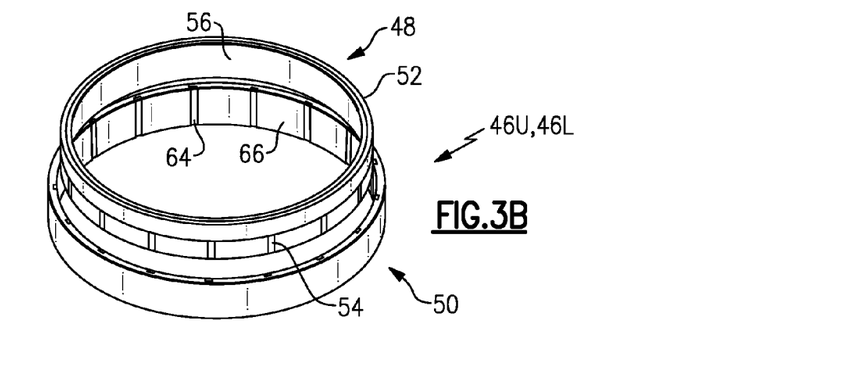
FIG. 3B is an expanded exploded view of the magnetic ring assembly of a de-rotation system.
Figure 3C:
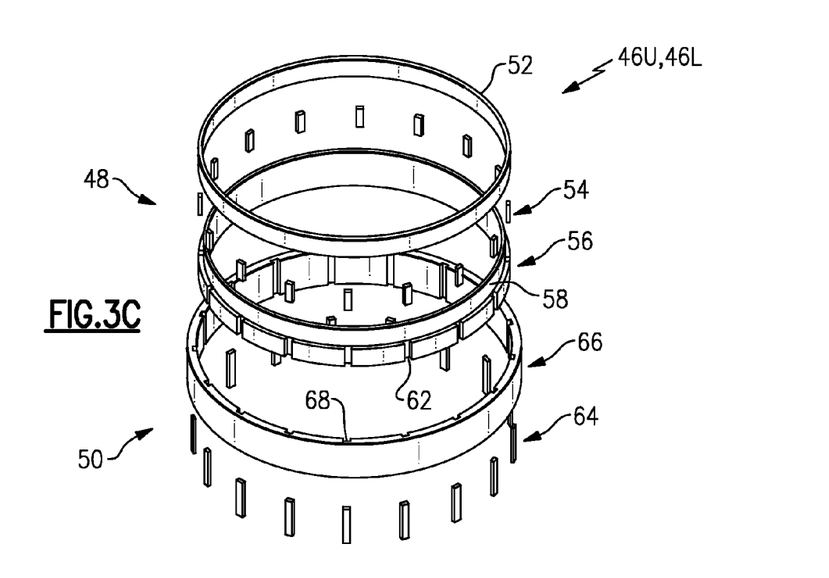
FIG. 3C is an exploded view of a magnetic ring de-rotation system of FIG. 3A.

Referring to FIG. 3B, the inner ring 48 generally includes an eddy current ring 52 and a multitude of inner ring magnets 54 mounted to and supported by a rotor shaft adapter ring 56 (also illustrated in FIG. 3C). The eddy current ring 52 extends for a first axial length of the inner ring 48 while the multitude of inner ring magnets 54 extend for a second axial length of the inner ring 48. The eddy current ring 52 is manufactured of an electrically conductive material such as, for example only, copper as it has a high conductivity (which also translates to lower losses in terms of heating). Alternatively, aluminum, brass or other conductive may be utilized.

The rotor shaft adapter ring 56 defines a reduced diameter 58 to receive and support the eddy current ring 52 and a multitude of axial slots 62 to receive and support the respective multitude of inner ring magnets 54. Although one non-limiting embodiment illustrates the first axial length and the second axial length as generally equivalent, it should be understood that other spacing distributions may alternatively be provided. Furthermore, various numbers and distributions of the multitude of inner ring magnets 54 may be utilized.

The outer ring 50 generally includes a multitude of outer ring magnets 64 mounted to a fairing adapter ring 66 (also illustrated in FIG. 3C). Each of the multitude of outer ring magnets 64 extends for a third axial length of the outer ring 50. The fairing adapter ring 66 defines a multitude of axial slots 68 to receive and support the respective multitude of outer ring magnets 64. Although one non-limiting embodiment illustrates the third axial length as being over the entire axial length of the fairing adapter ring 66, it should be understood that other spacing distributions may alternatively be provided, such as having the third axial length being approximately equivalent to the first and second axial lengths combined, larger than the first axial length, or larger than the second axial length. Furthermore, various numbers and distributions of the multitude of outer ring magnets 64 may be utilized.

Figure 4A:
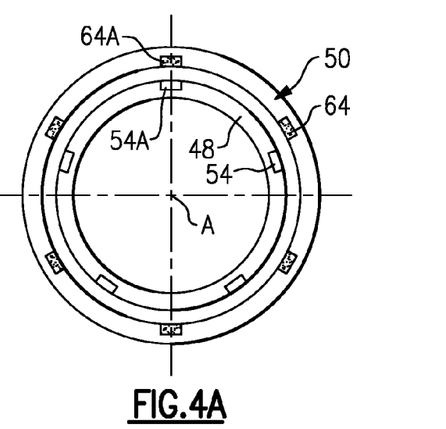
FIGS. 4A-4C are top schematic views of a magnetic ring assembly of the de-rotation system.
Figure 4B:
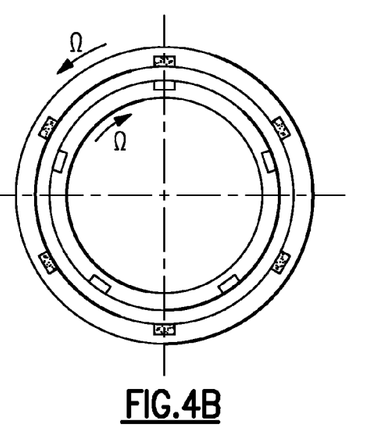
Figure 4C:
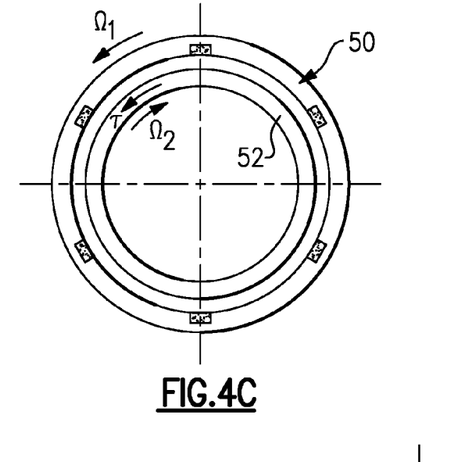

Referring to FIGS. 4A-4C, one non-limiting embodiment of a magnet distribution for the inner ring 48 multitude of inner ring magnets 54 may include five (5) magnets which are of a common polarity and equally distributed, here, at an equivalent circumferential spacing. The outer ring 50 magnet distribution for the multitude of outer ring magnets 64 includes six (6) magnets which are of a common polarity and equally distributed, in which the zero (0 degree) position magnets 54A, 64A are directly adjacent such that cogging torque is provided due to the opposite poles (i.e. the polarity of the inner ring magnets 54 is opposite that of the outer ring magnets 64). The cogging torque is maximum when opposite poles are aligned to produce align every thirty (30) degrees (FIG. 4B) while the outer ring magnets 64 induce eddy currents in the eddy current ring 52 during rotation (FIG. 4C).

Figure 5A:
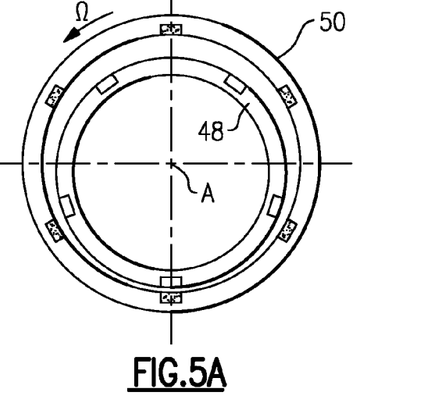
FIGS. 5A-5B are top schematic views of another magnetic ring assembly of a de-rotation system.
Figure 5B:
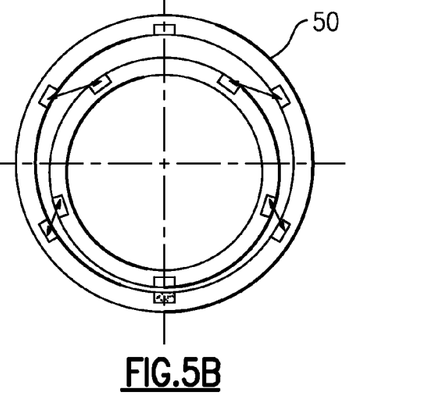

Referring to FIGS. 5A-5B, another non-limiting embodiment includes an inner ring 48 which is eccentric to the outer ring 50 such that the closest position between the inner ring 48 and the outer ring 50 is at the one hundred eighty (180 degree) position. The inner ring 48 magnet distribution for the multitude of inner ring magnets 54 may include five (5) magnets which are of opposite polarity and unequally distributed circumferential spacing. The outer ring 50 magnet distribution for the multitude of outer ring magnets 64 includes six (6) magnets which are equally distributed. Attraction and repulsion between sets of the magnets (FIG. 5B) which produces, in this example, a single stable position.

In operation, rotation of the outer rotor shaft 12L with respect to the fairing 42 induces eddy currents in the upper magnetic ring assembly 46U. This eddy current, in addition to the forces between the magnets 54, 64 tends to drag the fairing 42 in the same direction as the outer rotor shaft 12L. Concurrently therewith, rotation of the inner rotor shaft 12U results in an equal and opposite torque on the fairing 42 from the lower magnetic ring assembly 46L. The net torque on the fairing is zero such that the fairing 42 remains in a stable position. The eddy current ring 52 of the upper and lower magnetic ring assemblies 46U, 46L provide a damping to the angular motion of the fairing 42 while the forces between the magnets 54, 64 of each assembly 46U, 46L provide a return spring force. The eddy currents are induced by the relative velocity between the eddy current ring 52 and magnets 64 such that the eddy currents are proportional to the relative velocity. More specifically, the eddy currents are generated on the surface of the eddy current ring 52 and can be interpreted as flowing in loops in a plane perpendicular to the magnetic lines of force from the magnets 64.

The effect of the eddy currents is to generate a magnetic field opposite in polarity to that of the magnets 64 (trying to cancel the field generated by the magnets). This is a consequence of a fundamental law called Lenz's law. As these two magnetic fields are of opposite polarity, they attract, and tend to decrease the relative motion between the eddy current ring 52 and the permanent magnets 64. In this way, a torque is generated on the eddy current ring 52, which tends to drag it along with the moving permanent magnets 64. If there is no relative motion between the eddy current ring 52 and the permanent magnets 64, there are no eddy currents induced. The eddy currents generally retain the fairing 42 in a stable constant angular position relative the airframe 14 while the rotor system 12 rotates while the forces between the magnets 54, 64 provide a return spring force when the rotor system 12 is slow or generally stationary.

The magnetic de-rotation system is passive such that no contact and no power supply is required. The passive de-rotation system may alternatively be manufactured with a predetermined amount of coning, so as to accommodated shaft fairing geometries that exhibit a necking, or hour-glass shape to be packaged to fit within the volume between the fairing system and the rotor shaft system.

It should be understood that relative positional terms such as "forward," "aft," "upper," "lower," "above," "below," and the like are with reference to an illustrated attitude of the structure and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A de-rotation system comprising:
    a fairing;
    an inner ring which supports an eddy current ring and at least one inner ring magnet, said eddy current ring extends for a first axial length of said inner ring while said at least one inner ring magnet extends for a second axial length of said inner ring; and
    an outer ring which supports at least one outer ring magnet, said at least one outer ring magnet extends for a third axial length of said outer ring such that said at least one outer ring magnet axially extends between said first axial length and said second axial length, attraction between said at least one inner ring magnet and said at least one outer ring magnet produces a stable rotational position, wherein said at least one inner ring magnet includes a multiple of inner ring magnets equally spaced about the circumference of said inner ring and said at least one outer ring magnet includes a multiple of outer ring magnets greater in number than said multiple of inner ring magnets.

2. The system as recited in claim 1, wherein said inner ring is eccentric to said outer ring.

3. A fairing system comprising:
    a shaft fairing mounted for rotation about an axis of rotation;
    a magnetic de-rotation system mounted to said shaft fairing to control a rotation of said shaft fairing about said axis of rotation;
    an upper magnetic ring assembly affixed to said shaft fairing; and
    a lower magnetic ring assembly affixed to said shaft fairing,
    wherein each of said upper magnetic ring assembly and said lower magnetic ring assembly comprises an inner ring which supports at least one inner ring magnet and an outer ring which supports at least one outer ring magnet, attraction between said at least one inner ring magnet and said at least one outer ring magnet produces at least one stable rotational position,
    wherein said inner ring is eccentric to said outer ring.

4. The system as recited in claim 3, wherein said inner ring comprises an eddy current ring and said at least one inner ring magnet.

5. The system as recited in claim 4, wherein said eddy current ring extends for a first axial length along said axis of rotation of said inner ring while said at least one inner ring magnet extends for a second axial length along said axis of rotation of said inner ring.

6. The system as recited in claim 5, wherein said outer ring comprises at least one outer ring magnet which extends for a third axial length of said outer ring.

7. The system as recited in claim 6, wherein said third axial length is approximately equal to said first axial length plus said second axial length.

8. The system as recited in claim 6, wherein said third axial length is greater than said first axial length.

9. The system as recited in claim 6, wherein said third axial length is greater than said second axial length.

10. The system as recited in claim 4, wherein said at least one inner ring magnet includes a multiple of inner ring magnets equally spaced about the circumference of said inner ring.

11. The system as recited in claim 10, wherein said outer ring comprises a multiple of outer ring magnets, said multiple of outer ring magnets greater in number than said multiple of inner ring magnets, at least one of said multiple of outer ring magnets being of an opposite polarity of at least one of said multiple of inner ring magnets.

12. A counter rotating coaxial rotor system comprising:
    a lower rotor hub mounted to a lower rotor shaft and configured to rotate about an axis of rotation;
    an upper rotor hub mounted to an upper rotor shaft and configured to rotate about said axis of rotation, said upper rotor shaft mounted through said lower rotor shaft and rotating in a direction opposite a direction of rotation of the lower rotor shaft;
    an upper hub fairing mounted at least partially about said upper rotor hub;
    a lower hub fairing mounted at least partially about said lower rotor hub;
    a shaft fairing mounted between said upper hub fairing and said lower hub fairing for rotation about said rotor axis of rotation;

an upper magnetic ring assembly affixed to said upper rotor shaft and said shaft fairing, said upper magnetic ring assembly comprising at least one inner ring permanent magnet; and a lower magnetic ring assembly affixed to said lower rotor shaft and said shaft fairing, said lower magnetic ring assembly comprising at least one outer ring permanent magnet;

wherein said upper magnetic ring assembly and said lower magnetic ring assembly each comprises an inner ring which supports said at least one inner ring permanent magnet and an outer ring which supports at least one outer ring permanent magnet, attraction between said at least one inner ring magnet and said at least one outer ring magnet produces a stable rotational position; and wherein said inner ring is eccentric to said outer ring.

13. The system as recited in claim 12, wherein said inner ring comprises an eddy current ring and said at least one inner ring magnet.

14. The system as recited in claim 13, wherein said eddy current ring extends for a first axial length of said inner ring while said at least one inner ring magnet extends for a second axial length of said inner ring.

15. The system as recited in claim 14, wherein said outer ring comprises at least one outer ring magnet which extends for a third axial length of said outer ring, said third axial length.

16. An aircraft comprising:

a lower rotor hub mounted to a lower rotor shaft and configured to rotate about an axis of rotation;

an upper rotor hub mounted to an upper rotor shaft and configured to rotate about said axis of rotation, said upper rotor shaft mounted through said lower rotor shaft and rotating in a direction opposite a direction of rotation of the lower rotor shaft;

an upper hub fairing mounted at least partially about said upper rotor hub;

a lower hub fairing mounted at least partially about said lower rotor hub;

a shaft fairing mounted between said upper hub fairing and said lower hub fairing for rotation about said rotor axis of rotation;

an upper magnetic ring assembly affixed to said upper rotor shaft and said shaft fairing; and a lower magnetic ring assembly affixed to said lower rotor shaft and said shaft fairing wherein said upper magnetic ring assembly includes a first plurality of magnets spaced about a circumference of said upper magnetic ring assembly, and said lower magnetic ring assembly includes a second plurality of magnets spaced about a circumference of said lower magnetic ring assembly, a number of magnets in said first plurality of magnets different than a number of magnets in said second plurality of magnets.

17. The aircraft as recited in claim 16, wherein said aircraft is a helicopter.

18. The aircraft as recited in claim 16, wherein said first plurality of magnets and said second plurality of magnets each comprise permanent magnets.

* * * * *